United States Patent [19]

Wheatley et al.

[11] 4,408,274

[45] Oct. 4, 1983

[54] MEMORY PROTECTION SYSTEM USING CAPABILITY REGISTERS

[75] Inventors: Nigel J. Wheatley, Broadstone; Martyn P. Andrews, Taplow, both of England

[73] Assignee: Plessey Overseas Limited, Ilford, England

[21] Appl. No.: 191,849

[22] Filed: Sep. 29, 1980

[30] Foreign Application Priority Data

Sep. 29, 1979 [GB] United Kingdom ............... 7933857

[51] Int. Cl.³ ............................................ G06F 11/00
[52] U.S. Cl. ................................... 364/200; 364/900
[58] Field of Search ... 364/200 MS File, 900 MS File

[56] References Cited

U.S. PATENT DOCUMENTS

| 3,771,146 | 11/1973 | Cotton et al. | 364/200 |
|---|---|---|---|
| 3,778,776 | 12/1973 | Hakozaki | 364/200 |
| 3,787,813 | 1/1974 | Cole et al. | 364/200 |
| 3,814,919 | 6/1974 | Repton et al. | 364/200 |
| 3,905,023 | 9/1975 | Perpiglia | 364/200 |
| 4,121,286 | 10/1978 | Venton | 364/200 |

FOREIGN PATENT DOCUMENTS 8355 3/1980 Fed. Rep. of Germany .
1329721 9/1973 United Kingdom .

OTHER PUBLICATIONS

Requa, Joseph E., "Virtual Memory Design Reduces Program Complexity" *Computer Design*, Jan. 1978, pp. 97-106.

Primary Examiner—Felix D. Gruber
Assistant Examiner—D. Rutherford
Attorney, Agent, or Firm—Fleit, Jacobson, Cohn & Price

[57] ABSTRACT

The use of protected capability registers to hold the physical base and limit addresses and access rights for a block of memory and the way in which such registers are loaded using System Capability Tables and reserved segment pointer tables is well known in the prior art. In the present invention the normal capability load instruction has been enhanced in four major ways:

(a) allowing additional capability classes to be handled
(b) instituting a "load on use" facility
(c) instituting capability propagation control and
(d) implementing access reduction facilities The capability classes comprise (i) system store, (ii) system resource, (iii) local store and (iv) passive capability. The "load on use" facility speeds up the load capability instruction and the change process instruction. The propagation control mechanism introduces an access bit which controls the storing of the capability pointer preventing the passing of the pointer from one process to another, whereas the hardware access reduction facility enables a capability to be loaded into a capability register with reduced access right.

9 Claims, 9 Drawing Figures

| | FD B1 | PP | EC | WC | RC | ED | WD | RD | FD B2 | SCT | | | | | | | | | | | | | | |
|---|---|---|---|---|---|---|---|---|---|---|---|---|---|---|---|---|---|---|---|---|---|---|---|---|
| | | | | PAB | | | | | | | | | | | | | | | | | | | | |
| | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| SYSTEM STORE SSC | 1 | X | X | X | X | X | X | X | 0 | X | | | | | | |←|—|SCT OFFSET|—|→| | | |
| PASSIVE PC | 1 | X | 0 | 0 | X | X | X | X | 1 | |←|—|—|—|—|—|—|VALUE|—|—|—|—|—|→| |
| LOCAL STORE PC (LS) | 1 | 0 | X | X | 0 | X | X | X | 1 | 0 | |←|—|—|—|DUMP STACK OFFSET|—|—|→| | | | | |
| OTHER PC (0) | 1 | X | ←|—|TYPE|—|→| | 1 | 1 | | | | | | | | | | | | | | |
| SYSTEM RESOURCE RC | 0 | X | ←|TYPE≠0|→| | | | 0 | X | | | | | | |←|—|SCT OFFSET|—|→| | | |
| DATA VALUE | 0 | 0 | | | | | | | | | |←|—|—|—|—|—|—|VALUE|—|—|—|—|—|→|

Fig. 5

MEMORY PROTECTION SYSTEM USING CAPABILITY REGISTERS

BACKGROUND OF THE INVENTION

The present invention relates to data processing systems incorporating memory protection systems of the type using so-called capability registers and is more particularly concerned with the provision of enhanced capability register loading arrangements.

FIELD OF THE INVENTION

Capability register structures are used to create a secure environment for each process in a multi-process time sharing data processing system.

DESCRIPTION OF PRIOR ART

Capability register handling operations are disclosed in U.S. Pat. Nos. 3,787,813 and 3,771,146. In such systems each process is allocated certain blocks of memory which hold its instructions and data. Each block is defined in size and location by Base and Limit Addresses and by an Access code which restricts the type of access which may be made to each block. A process is said to process the Capability to make allowed accesses to each of these areas of store. The values currently in use are held in hardware capability registers and every store access is checked against violation.

Base and Limit Addresses for System Store blocks are kept in the System Capability Table which is held in a block of fast-access memory defined by a Capability. Each process is allocated further blocks of memory which contain Capability Pointers. Each of these contains the Access code and an Offset value which selects a Base/Limit entry in the System Capability Table. These Capability blocks are also defined by Capabilities whose Base/Limit Addresses are kept in the System Capability Table. Thus, several processes may access a common store area, but each may be given a different access right.

Capabilities allow an ordered data structure to be set up. Each process contains at least one Capability block, the Process Capability Block, from which all other blocks for that process may be accessed, either directly or by way of other Capability blocks. Any attempted violation of this structure causes an interrupt to a fault handling routine.

The protection afforded by the use of Capabilities is extended to the operation of the peripherals by connecting all memories and Input/Output devices to the processor by way of a parallel store bus. Unless a process has the Capability to access the corresponding store-bus address, no access can be made.

In U.S. Pat. No. 3,771,146 the concept of capabilities was extended from "fast-access memory" to cover other resources such as allocatable peripherals and backing store files by introducing the concept of "passive" capabilities which cause a trap when loaded into a capability register.

It is an aim of the present invention to improve the flexibility of capabilities to enhance the operation of a data processing system incorporating capability registers.

SUMMARY OF THE INVENTION

According to the invention there is provided a data processing device including capability registers which are loaded with base, limit and access information using a capability pointer block referencing a system capability table under the control of a load capability instruction characterised in that the general purpose capability registers are provided with pointer registers which are loaded with a capability pointer by the load capability instruction and each general purpose capability register includes a "load on use" indicator which is set when the corresponding pointer register is loaded and the data processing device is arranged to automatically load the base, limit and access information into the capability register when that capability register is used with the "load on use" indicator set.

This feature means that the load capability instruction itself is speeded up enormously. Although the additional work of the instruction is postponed until the first reference is made to information within the block, in the case of register to register and store to store transfers, which, experience shows, represent a considerable proportion of capability instructions the final resolution is not required and hence not performed using the techniques provided by the invention.

The invention also introduces the concept of a "propagation permit" bit into the access code of a capability pointer providing the facility of preventing that pointer from being passed from one process to another unless the propagation permit bit in the source pointer and the sink pointer is set. If the propagation permit access bit is not set in a pointer then that pointer may only be stored in local segments particular to the process and not in common access segments.

The invention further introduces the concept of access reduction in the load capability instruction. This enables a capability pointer to be loaded into a pointer and consequently into the associated capability register with a reduced access right. This is achieved by a "load capability masked" instruction which will mask out selected access bits of the pointer as it is loaded.

BRIEF DESCRIPTION OF THE DRAWINGS

The invention will be more readily understood from the following description of one embodiment which should be read in conjunction with the accompanying drawings. Of the drawings:

FIG. 5 shows a table of capability pointer formats, FIG. 8 shows the flow diagram of the operations performed to load a capability register while

DESCRIPTION OF THE PREFERRED EMBODIMENT

Figure 1:
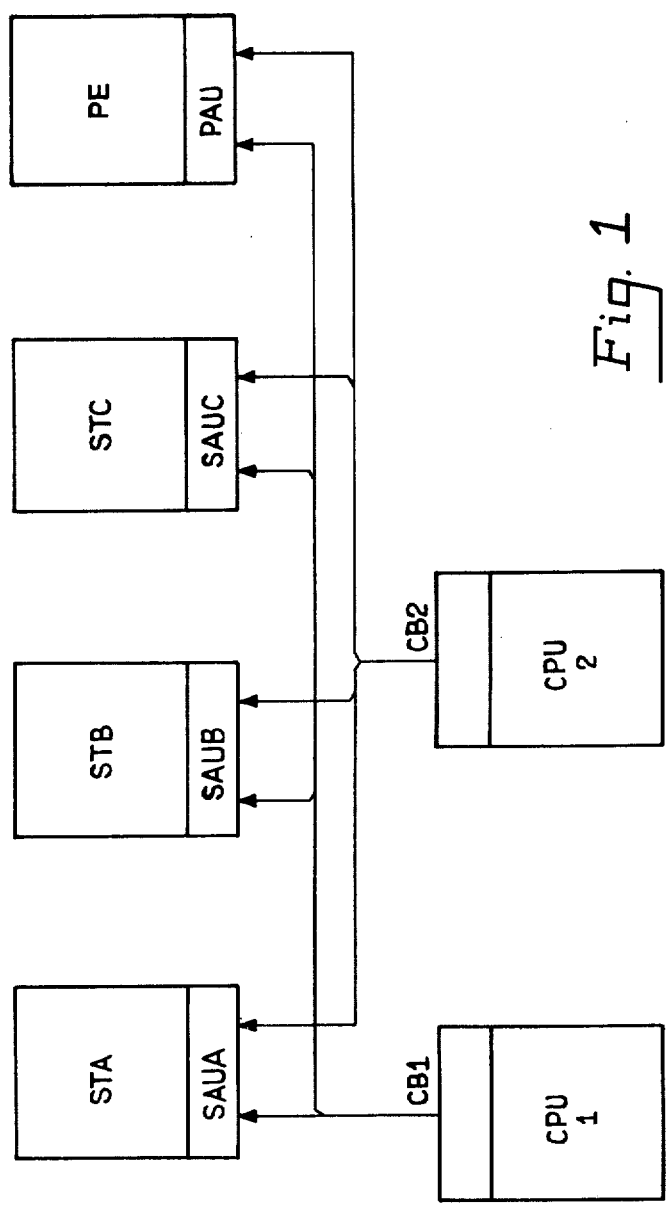
FIG. 1 shows a block diagram of a typical multiprocessor system for use with one embodiment of the invention.

Considering firstly FIG. 1, it will be seen that a modular data processing system is shown including (i) a number of processing units CPU1 and CPU2, (ii) a number of storage modules STA, STB and STC and (iii) a group of peripheral equipments collectively shown as PE. Each storage module and each peripheral equipment is provided with an access unit SAUA, SAUB, SAUC and PAUN.

Each processing unit is provided with a discrete communication path or bus (CB1 and CB2 respectively for processing units CPU1 and CPU2). Each bus is terminated upon a separate port of all the access units (SAUA, SAUB, SAUC and PAUN).

All the access units are provided with the facility of recognising coded address information when applied to the buses terminated on their input ports. The various segments used in the handling of processes are distributed throughout the storage modules and all addressing operations are based on the capability register protection system.

Figure 2:
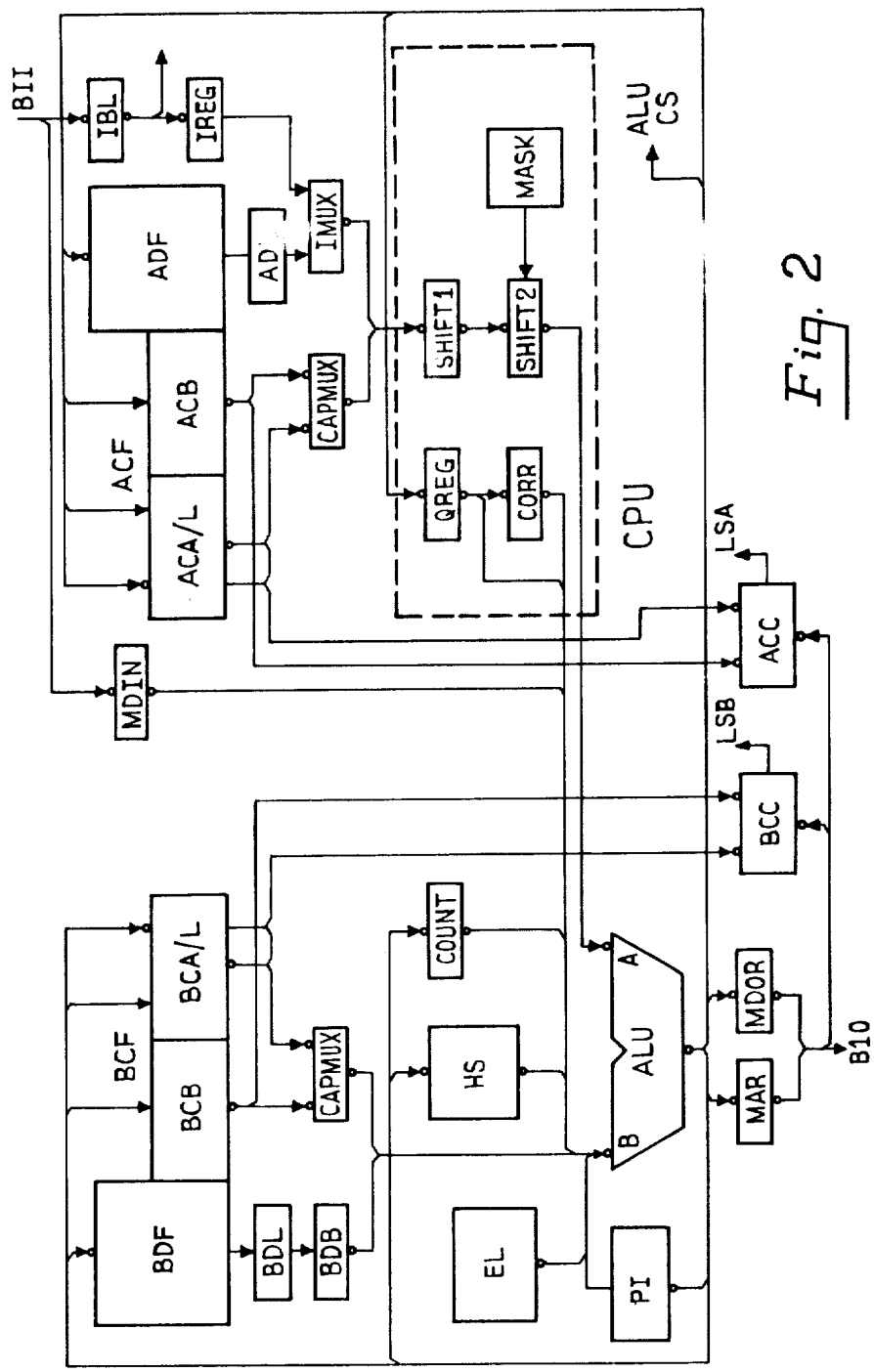
FIG. 2 shows in block diagram for a typical processor unit suitable for use in the embodiment of the invention.

Considering now FIG. 2, it will be seen that each processing unit CPU includes an A data file ADF and a B data file BDF each including 32 locations together with A and B capability register files ACF and BCF. The capability registers are used to provide information protection arrangements of the type disclosed in U.S. Pat. No. 3,787,813. The data files ADF and BDF provide duplicated register arrangements and each include eight general purpose registers.

Register Types

Figure 3:
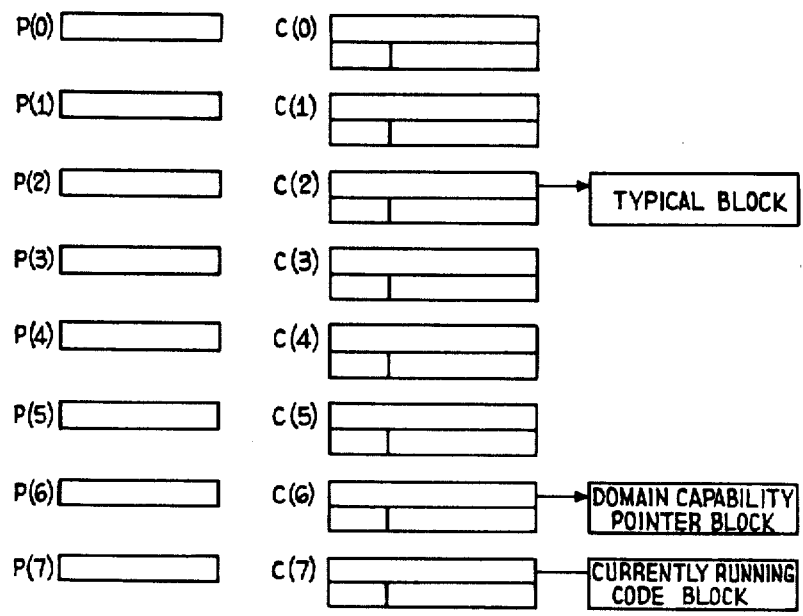
FIG. 3 shows the general purpose registers held in a register file in the processor unit.
Figure 3:
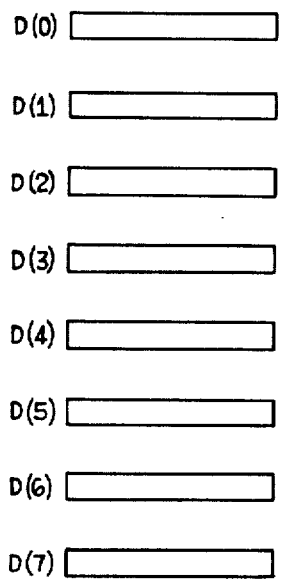
Figure 4:
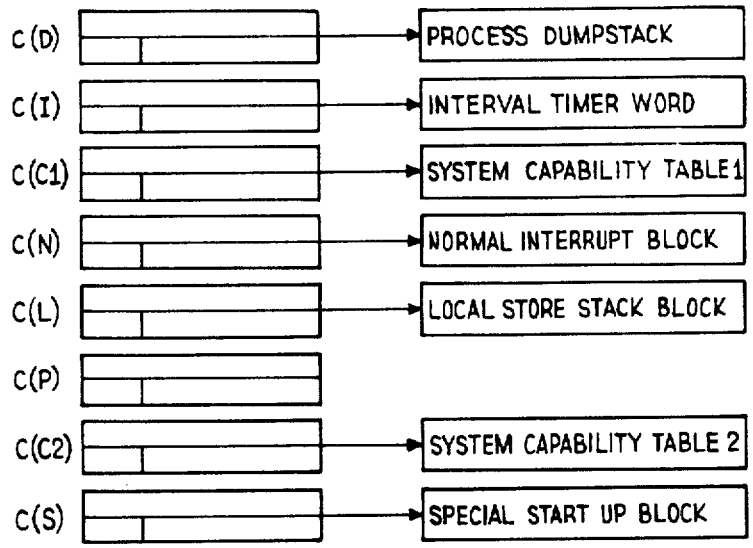
FIG. 4 shows the special purpose registers and the indicator registers in the processor unit.
Figure 4:
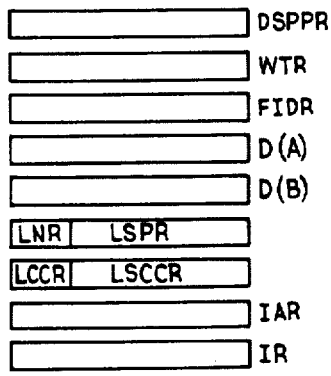
Figure 4:
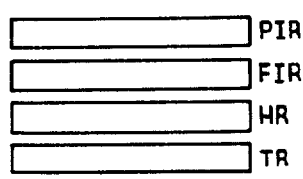

There are four types of registers namely Data Registers, Capability Pointer Registers, Capability Registers and Indicator Registers. Within the first three types, some are general purpose and are directly accessible to all programs. The others are special purpose registers used for specific functions and accessible only to programs possessing the appropriate Capabilities. The complete register structure is illustrated in FIGS. 3 and 4.

General Purpose Data Registers (D(0) to D(7))

There are eight general purpose Data Registers, each 24 bits long, referred to as D(0) to D(7) in which all data manipulation is performed. Seven of these registers D(1) to D(7) may also be used as address modifiers during the formation of store addresses. Register D(0) is a Mask register and may be used to specify the required bits, when transferring part of a word to or from store.

General Purpose Capability (C(0) to C(7)) and Pointer (P(0) to P(7)) registers Capability Pointers may be loaded into eight general purpose Capability Pointer Registers referred to as P(0) to P(7). When one of these Capability Pointer Registers are specified in an address construction the corresponding Capability Register (referred to as C(0) to C(7)) is loaded, if this has not been done previously. When the Capability Register is loaded it will contain a base address, limit address and access rights for a block in store.

Capability Register C(7) is used by the processor to hold the Capability for the current program block, so that any instruction which loads a new Capability into C(7) causes a transfer of control to the block defined by the loaded Capability. Every time an instruction is read from the program block the processor checks that C(7) has an EXECUTE DATA bit set in its Primary Access Field and that the address of the instruction lies between the Base and Limit addresses of the Capability. If a Capability is loaded into C(7) which does not have the EXECUTE DATA bit set, a Fault Interrupt is generated on subsequent use. Also if the instruction address lies outside the range of the Base and Limit, a Fault Interrupt is generated. Capability Register C(6) is generally used to reference the Domain Capability Pointer Block.

Special Purpose Data Registers

The special purpose Data Registers are listed below.

1. Instruction Address Register (IAR)

This register contains the absolute address of the current instruction within the program block specified by the general purpose Capability Register C(7).

2. Watch-Dog Timer Register (WTR)

This register is decremented once every 100 $\mu$sec. If it reaches zero, a Fault Interrupt is caused. It therefore measures the total time each process is active.

3. Interrupt Accept Register (IR)

This register contains a single bit, bit 6, which is set when a Program Trap is accepted.

4. Process Dump-Stack Pushdown Register (DSPPR)

This register contains an absolute address pointer which defines the current top of the Process Dump-Stack (i.e. it points to the first word in the area available for dumping).

5. Fault Indicator Dump Register

Following the first Fault Interrupt, this register contains the state of the Fault Indicator Register.

6. Level Number (LNR) and Local Store Stack Pointer Register (LSPR)

This register is divided into two parts. The most significant 8 bits contains the current link level number of the process. The least significant 16 bits of the register contains a relative address pointer (relative to the Base of C(L)) which defines the current top of the Local Store Stack (i.e. it points to the first word in the area available for allocation).

7. Local Capability Count (LCCR) and Local STORE CLEAR COUNT REGISTER (LSCCR)

The register is divided into two parts. The most significant 8 bits contain the count of the number of local capabilities created at the current link level. The least significant 16 bits of the register contain the local store clear count.

8. Data Registers D(A) and D(B)

These registers are not used by any of the functions of the processor, but can be accessed by data instructions using 'Internal Mode'.

Special Purpose Capability Registers

There are eight special purpose Capability Registers, which are used by the processor unit to access control information. They can be read and altered by programs which have the capability of addressing in 'Internal Mode' since special loading instructions are not provided.

1. Capability Register C(D)

This register contains Base/Limit Addresses and Access code for the Processor Dump-Stack of the active process.

2. Capability Register C(I)

This register defines a block of store the first word of which contains the Interval Timer value. It measures the absolute time-elapsed and it is decremented once every $\phi\mu$sec by the Processor unit. When it reaches zero, a Normal Interrupt is generated.

3. Capability Register C(C1)

This register defines a block of store containing the first part of the System Capability Table.

4. Capability Register C(C2)

This register defines a block of store containing the second part of the System Capability Table.

5. Capability Register C(N)

This register defines a block of store the first word of which contains a Capability Pointer which permits entry to the Normal Interrupt process.

6. Capability Register C(S)

This register defines a four word block of store which is used by the processor when dealing with Fault Interrupts. The 12 most significant bits of the Base word are incremented during the fault sequence, the remainder of the register being preset by the processor following power-up.

7. Capability Register C(L)

This register defines a block of store for the Local Store Stack of the current process.

8. Capability Register C(P)

This register is used by the Programmer Interface when accessing store.

Indicator Registers

There are four Indicator Registers: Primary Indicator (PIR FIG. 2 and FIG. 4), Fault Indicator FIR, Test TR and Historical HR register. They indicate various conditions within the Processor. They are accessible in Internal Mode only.

Test Register (TR)

This register contains control facilities for testing the fault detection mechanisms.

Historical Register (HR)

One register of a group of sixteen 26 bit registers is addressable at a time, by a 4 bit address counter. They constitute a First-in/First-out circular queue for use on fault investigative routines.

The use of the above registers together with the bit multiplexer BM, the arithmetic unit ALU, the instruction register IREG, the data in register MDIN the memory address register MAR, the data out register MDOR and the A and B Capability check comparators ACC and BCC all shown in FIG. 2 will be more readily seen later with reference to the operation of the processor in the execution of the instructions which manipulate the information in the capability register.

Capability Formats

A capability pointer is a 24 bit value, it comprises three items of information, the capability form, access and identity. Basic form and access information is held in the most significant nine bits while the capability identity is held in the least significant fifteen bits relative to the base of the System Capability table.

General form classifications identify system store, system resource and passive capabilities using the form discrimination bits 15 and 23. The primary access field is bits 16–22 of which bit 22 is common to all capability forms and is treated as the PROPAGATION PERMIT bit. The interpretation of the other six primary access bits is dependent on the capability form.

System store form (discrimination bit 23=1, bit 15=0) identifies capabilities for store segments addressed through the System Capability Table. The System Capability Table may be partitioned into two parts, the part to be used is selected by bit 14. If this bit is a zero C(C1) is selected else C(C2) is used.

The format of an entry in the System Capability Table is shown in FIG. 5. The Base Address is 24 bits with the top eight bits defining a Module Number. The Limit Address is 16 bits and is concatenated to the Module Number. The block defined has absolute store addresses in the range 'Base' to 'Module Number/Limit' inclusive. The Sumcheck word provides a method by which the hardware may validate the Base/Limit values independently of parity checks:

Sumcheck = Base + Limit, circulated right by 9 bits

The format of a Capability Pointer in a Capability Block is shown in FIG. 5. The offset is 14 bits and points to the Sumcheck word of an entry in the System Capability Table, relative to the Base Address of the Table. The access field (bits 16–22) is 7 bits as follows:

1. Bit 22—PROPAGATION PERMIT bit.
2. Bits 19–21—Capability Access Bits READ, WRITE and ENTER CAPABILITY.
3. Bits 16–18—Data Access Bits READ, WRITE and EXECUTE DATA.

If a bit is set to a '1', it implies the possession of the Capability to perform that type of access.

When stored in a Capability Register within the processor the Base Address is stored in the first word and the primary access bits together with the Limit Address are stored in the second word. The corresponding Capability Pointer Register contains a copy of the pointer from store.

System Resource forms RC (discrimination bit 23=0, bit 15=0) identify system resource capabilities i.e. capabilities with an implied enter access together with a system resource type identification. In this case bits 0–14 of the pointer form the SCT offset and SCT selector and the system capability table entry is as for the System store capabilities. The access field (bits 16–22) is as follows:

1. Bit 22—PROPAGATION PERMIT bit.
2. Bits 16–21—Resource type field (type zero not permitted.

When stored in a Capability Register this capability form is as for the system store capability with the exception that the most significant eight bits of the second word have the conventional store access setting.

Passive forms PC (discrimination bits 23=1, bit 15=1) describe hardware capabilities which do not identify system storage. Passive capabilities provide the potential for extending capability 'types' by hardware extension. Currently the local store passive capability is the only type defined. Bit 14 is used to discriminate this type of passive capability from all others by a setting of zero.

Local store passive capabilities PC(LS) identify sub-blocks of store within the process Local Store C(L), for these capabilities propagation access is not permitted. The offset field bits 0–13 contains an offset of the current process dumpstack. The dumpstack entry in this case is similar to the SCT entry except that base and limit entries are relative to the process work stack base. When stored in the capability register the absolute base and limit of the sub-block of store together with the primary access bits of the pointer are held in the first two words while the Capability Pointer Register contains a copy of the pointer from store.

The entries in the first two words of the Capability Register for other passive types are undefined.

Data DV may be stored in capability pointers when the bits 22 and 23 are zero. For systems not using the system resource form of capability this may be 22 bit data value while for systems using this form the data value is restricted to 16 bits.

Consideration will now be given to the performance of the processing unit of FIG. 2 in the execution of the various instructions which manipulate the information held in the capability registers. The various operations performed by the processing unit are controlled by a micro-program control unit not shown in the drawings but it will readily be appreciated by those skilled in the art that the required operations defined by the flow diagrams of FIGS. 6 to 9 can be interpreted for example using programmed read-only memories generating the required control signals for each flow diagram step. Throughout the following description various CPU register to register transfers occur and to simplify the disclosure a shorthand notation involving the symbol := will be used. This symbol should be read as defining "becomes" so that the statement ALU:=MDIN should be read as the arithmetic unit (ALU) accepts the data held in the data in register MDIN.

Figure 6:
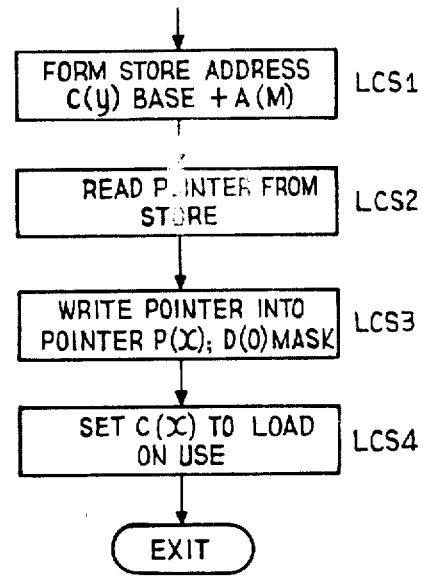
FIG. 6 shows the flow diagram of a load capability register instruction.

The first instruction to be considered is the "load capability" instruction and the flow diagram for that instruction is shown in FIG. 6. The "load capability" instruction operates in a corresponding manner to that disclosed in U.S. Pat. No. 3,787,813 save that the descriptor is not loaded into the capability register and a "load on use" indicator associated with the capability register is set.

Load capability instruction

At the top of FIG. 6 the instruction word LCIW is shown and this is fed into the instruction register buffer IBL of FIG. 2 for interpretation by the micro-program control unit (not shown). The function code LC(x) defines that a capability C(x) is to be loaded with the capability defined by the pointer stored in the block defined by C(y) at an offset address in that block defined by the A value as modified by the contents of a general purpose data register specified by the M value. The reception of the instruction word by the micro-program control unit causes the load capability instruction sequence to be performed after the instruction word has been gated into the instruction register IREG. The following sequence of steps are then automatically performed under micro-program control.

Step LCS1—FORM STORE ADDRESS

In this step the capability register defined by C(y) in the instruction word is selected in the B stack and the base value is passed through the capability multiplexer CAP MUX to the "B" input of the arithmetic unit ALU. The A value from the instruction register IREG is passed through the instruction multiplexer IMUX to the "A" input of the arithmetic unit ALU assuming there is no address modification required (i.e. M=0). The arithmetic unit is then conditioned for an add operation and the result will be passed into the store address register MAR and a store read operation will be requested. Typically the above sequence can be defined in shorthand form as follows:

ALU b:=C(y) BASE
ALU a:=IREG (A value)
ALU add
MAR:=ALU
Store read @ MAR

Step LCS2—READ POINTER FROM STORE

In this step the data read in step LCS1 will be passed into the input register MDIN from the store over the processor bus such as CB1 in FIG. 1 by way of leads BII in FIG. 2.

Step LCS3—WRITE POINTER INTO P(x)

In this step the required pointer registers in the A and B files will be selected by the micro-program control unit in accordance with the value defined by C(x) and the data in MDIN will be written into those registers using the following typical sequence:

ALU a:=MDIN
AP(x):=ALU
BP(x):=ALU

During this step if the load capability instruction code defines that the access code requires to be masked the mask in general purpose data register D(O) is used to mask out selected access bits to reduce the access of the pointer loaded. The mask is loaded into D(O) prior to the execution of the "load capability masked" instruction.

Step LCS4—Set C(x) to LOAD ON USE

In this step the micro-program control unit will cause the load on use indicator in capability register C(x) to be set ready for the subsequent loading of the capability register using its newly loaded pointer register when reference to the relevant block is required later.

The operations for the load capability instruction are now complete and the capability register C(x) will remain with its "load on use" indicator set until an instruction is encountered having a capability specifying code selecting the particular capability register C(x).

Figure 8:
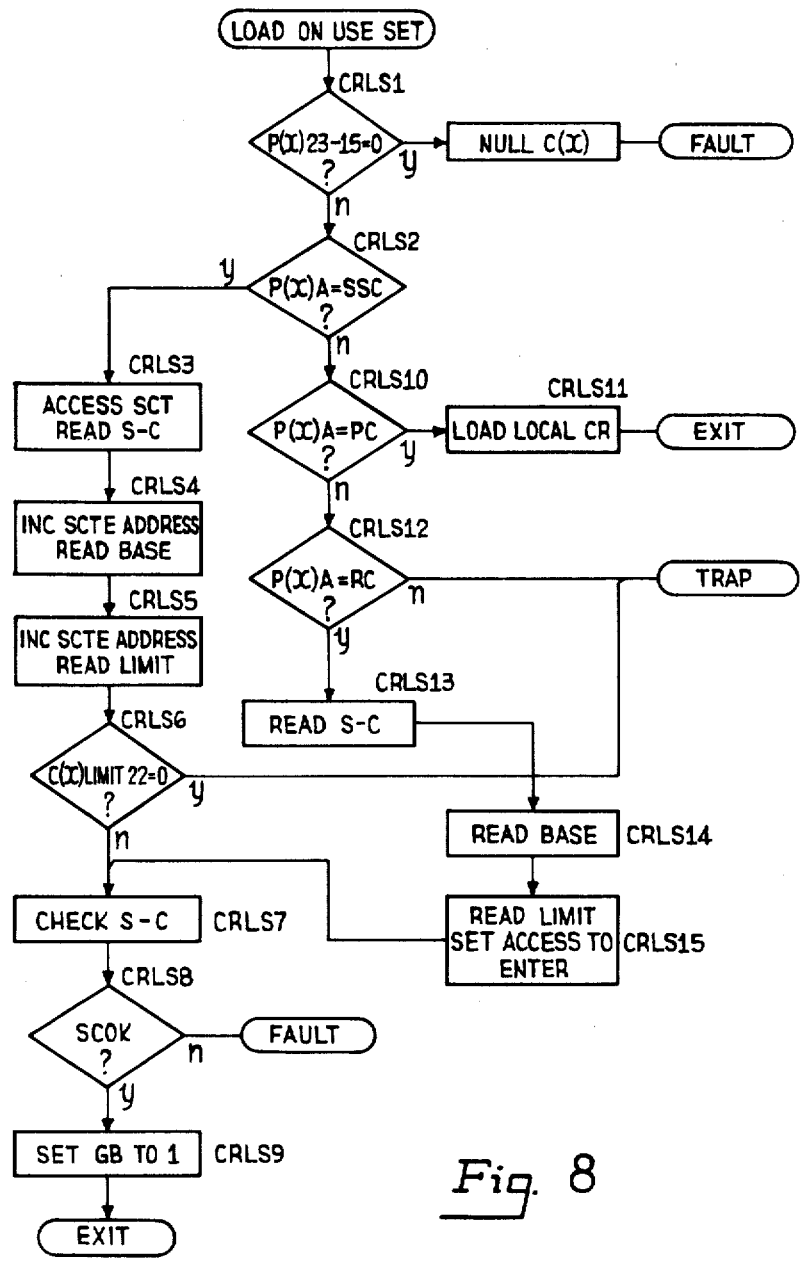

The detection of the load on use indicator in the set state will be achieved when the limit code of a capability is presented to ACC or BCC and the load set signal LSA or LSB will cause the micro-program control unit to automatically execute the sequence shown in FIG. 8.

Automatic Load Capability Register Sequence

When the "load on use" indicator is detected in the set state step CRLS1 is entered where the corresponding pointer P(x) is tested.

Step CRLS1—Is P(x) D23-15=0

In this step the access code of the pointer (associated with the capability register with its load on use indicator set) is tested to see if the pointer refers to a data value. If it does the capability register in question (i.e. C(x)) will be nulled and a fault generated since a data value pointer can not cause a load on use.

Step CRLS2—P(x) A=SSC

In this step the access code of Pointer Register P(x) is tested to see if bit 15 is zero and bit 23 is one indicating that the pointer refers to is a system store capability. Typically the micro-program control unit may inspect the access code of a selected pointer register directly or the pointer contents may be selected and passed through the arithmetic unit ALU for testing using the arithmetic condition signals ALU CS. If the access code specifies other than a System Store capability steps CRLS 10 and 11 are performed; if it is a passive resource local store capability or a system resource capability steps CRLS 12, 13, 14 and 15 are performed. If the access code specifies a system store capability steps CRLS 3 to 9 will be performed to actually load the base, limit and type code values into capability register C(x). The base and limit values are held in the system capability tables in blocks of store.

Figure 7:
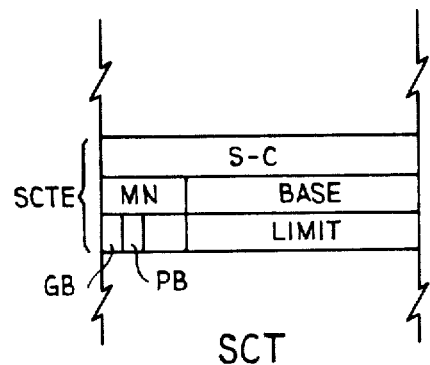
FIG. 7 shows a typical system capability table entry.

The System Capability Tables contain three word entries (SCTE FIG. 7) which comprise a sumcheck word S.C, a BASE word and a Limit word. The Base word contains a 24 bit absolute address of the first location of the specified block. The least significant 16 bits of the Limit word contains the Limit Offset, which together with the 8 most significant bits of the Base word are the 24 bit absolute address of the last location of the specified block. The Sumcheck word contains a 24 bit check word formed by adding (ignoring overflow) the 24 bit Base word to the least significant 16 bits of the Limit word and right circulating the result by 9 bits. Bit 23 of the Limit word is the GARBAGE bit and bit 22 is the PRESENCE bit. The format of a system Capability Table entry is shown in FIG. 7.

The GARBAGE bit is set by the processor whenever it is found reset when reading the three word system Capability Table entry. When the PRESENCE bit is set the three word System Capability Table entry is used to load the required capability register, but when reset the entry is "trapped" and the processor does not interpret the entry.

Step CRLS3—Access SCT; READ S.C

In this step the sumcheck value of the required system capability table entry SCTE is read into register D(x) in the processor using the following micro-program control unit sequence:

ALU a:=P(x) OS value
ALU b:=C(c) BASE
ALU add
MAR:=ALU
STORE READ @ MAR
MDIN:=BII
ALU a:=MDIN
D(x):=ALU

Step CRLS4—INC SCT address; READ BASE

In this step the next (i.e. BASE value) word in the selected entry is read into the processor using the following sequence:

MAR:=MAR+1
STORE Read @ MAR
MDIN:=BII
ALU a:=MDIN
AC(x) BASE:=ALU
BC(x) BASE:=ALU

Step CRLS5—INC SCT address; Read Limit

In this step the LIMIT value is read into the processor using the following sequence:

MAR:=MAR+1
Store Read @ MAR
MDIN:=BII
ALU a:=MDIN
AC(x) LIMIT:=ALU
BC(x) LIMIT:=ALU

Step CRLS6—Is C(x) LIMIT 22=0

In this step the presence bit (bit 22) of the SCT entry limit word is tested to see if the store block defined by the base and limit values in in store or not. If bit 22 is reset a TRAP is executed to enter the store handler routine to have the block brought from backing store into the main store.

Step CRLS7—CHECK S-C value

In this step the sum-check value read in step CRLS3 into one of the general purpose registers D(x) is checked against the values loaded in C(x). This operation was described previously under the heading of capability formats.

Step CRLS8—S.C OK?

The result of the computation performed in step CRLS7 is checked for zero within this step and if it is not then a fault has occurred as the data loaded into C(x) does not check against the sumcheck code. If the capability register has been loaded correctly step CRLS9 is performed.

Step CRLS9—Set GB to 1

In this step the garbage bit (bit 23 of the limit word) in the accessed system capability table entry is set to the 1 state. The following sequence is performed under micro-program control unit directions:

Store read @ MAR
MDIN:=BII
ALU a:=MDIN
SET BIT 23 to 1
Store write @ MAR

The above sequence is performed with the store module held throughout so that no other processor can access the SCT entry while the garbage bit is being amended.

This completes the sequence for loading a capability register with a system store capability. If the capability to be loaded was a resource capability step CRLS 13, 14, 15, 7, 8 and 9 are performed. The only difference between these steps and on the loaded capability register is set to "ENTER" in step CRLS 15.

From the above it can be seen that the load capability instruction causes the pointer register for the capability register specified in the instruction to be loaded with the capability pointer (access code and SCT offset value) for the system capability table entry which will be loaded into the specified capability register when that register is first used thereafter. The specified capability register is set into "a load on use" condition as soon as the capability pointer is loaded. This arrangement has the value of reducing substantially the time consumed by a load capability instruction postponing the "time penalty" required to load up the capability register until that register is actually to be used. In certain circumstances the "time penalty" must never be encountered as the load capability instruction may only have been performed so that the capability pointer can be stored in say a capability block under construction. The following description which refers to FIG. 9 relates to the operations performed in the storage of a capability pointer.

Store Capability Instruction

Figure 9:
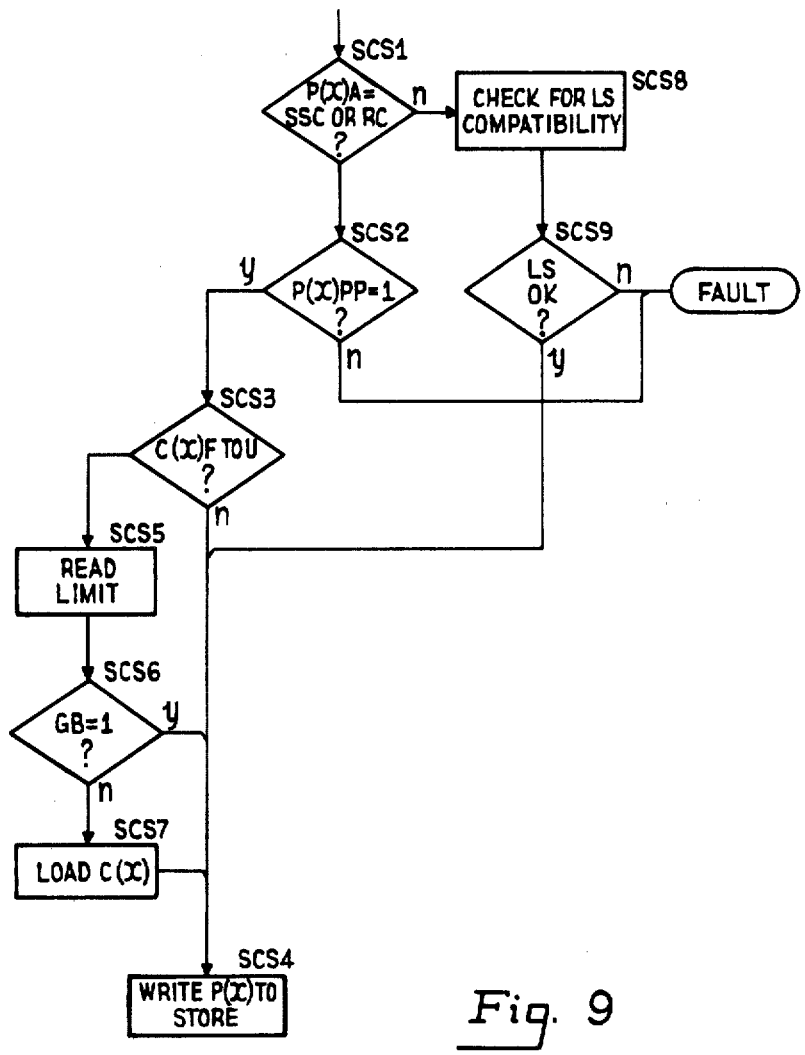
FIG. 9 shows the flow diagram of a store capability instruction.

At the top of FIG. 9 the instruction word SCIW is shown for this instruction. The function code (SC) defines that the capability pointer in the pointer register associated with capability register C(x) should be copied into the store block defined by the segment descriptor in capability register C(y) at an offset addresse defined by the value A modified by the contents of the modifier register specified by the M code.

Step SCS1—P(x)A=SSC or RC?

In this step the access code for the capability pointer to be stored is checked to see if it is (a) a system store capability (SSC) or (b) a system resource capability (RC). If it is not it will have to be checked to see if it is a local store capability and this will be performed in steps SCS8 and 9. Such an operation is achieved by passing the pointer from P(x) into the arithmetic unit and testing the ALU CS signal.

Step SCS2—P(x) 22=1?

In this step the propagation permit bit is tested to see if the pointer selected can be copied (i.e. propagated). If this bit is zero a fault condition is signalled. Typically the test is achieved at the same time as that performed in step SCS1 using the arithmetic unit condition signals ALU CS.

Step SCS3—C(x)=LOU?

In this step the "load on use" indication (LOU) held in the corresponding capability register defined by the C(x) value in the instruction word is tested. It will be recalled that the load on use indicator is set when a load capability instruction is performed and the actual capability register is only loaded when it is required to use that register for a "segment" access. If the actual capability register C(x) has not been loaded step SCS5 will be performed whereas step SCS4 will be performed if the LOU indicator is reset.

Step SCS4—WRITE P(x) to Store

In this step the following operations are performed to write the pointer in P(x) into the store location defined by the instruction word SCIW.

ALU a:=IREG (A value)
ALU b:=C(y) BASE
ALU add
MAR:=ALU
P(x):=ALU a
ALU:=MDOR
STORE Write MDOR at MAR address If the "load on use" indicator is set as mentioned previously step SCS5 is performed.

STEP SCS5—READ LIMIT

In this step the limit value (i.e. the third word of the SCT entry) is read from the System capability table so that the garbage bit for that entry can be tested in step SCS6.

Step SCS6—GB=1?

It will be recalled that the garbage bit is set each time the entry is accessed. This bit is used to assist in defining those segments which are no longer being used. Typically the system includes a "garbage collection" arrangement which functions in the manner defined in U.S. Pat. No. 4,121,286. If the garbage bit is set (GB=1) then the descriptor in the SCT entry has been recently accessed and step SCS4 can be performed to store the capability pointer, however, if GB=0 step SCS7 is performed (prior to performing step SCS4) to cause the garbage bit to be set.

From the above it can be seen that the store capability instruction can be transversed without the actual capability register having to be loaded which of course saves significantly on instruction execution time and reduces the capability register time penalty.

The invention has been disclosed with reference to one embodiment only. Those skilled in the art will realise that other machine constructions could have been employed as long as they incorporate the essential feature defined above required for the execution of the invention.

What we claim is:

1. A data processing system including a processor module incorporating general purpose capability registers which are loaded with base, limit and access information relative to a resource segment under control of the steps of a load capability register instruction operating upon a capability pointer block particular to a process running in said processor module and referencing a system capability table common to all processes in said data processing system, characterized in that each of the general purpose capability registers is provided with a corresponding pointer register which is loaded with capability pointer information by said load capability register instruction derived from the capability pointer block for a process running in the processor module and each general purpose capability register includes a load on use indicator which is set when a corresponding pointer register associated with each respective general purpose capability register is loaded with said pointer information and the processor module includes means for automatically loading base, limit and access information identified by pointer information into an active one of said capability registers when said active capability register is used with the load on use indicator set, said access information comprising a plurality of access bits and said processor module further includes means for executing a load capability register masked instruction which comprises the step of masking out selected access bits of said access information to reduce permitted access rights established by said pointer information loaded in a corresponding pointer register associated with said active capability register.

2. A data processing system according to claim 1 in which the processor module includes means for automatically resetting said load on use indicator during the loading of the capability register.

3. A data processing system according to claim 1 or 2 in which the processor module includes means for performing a load capability register masked instruction which comprise the steps of masking out selected access bits of said access information to reduce the permitted access rights established by said pointer information loaded in the pointer register.

4. A data processing system according to claim 1 or 2 in which the access information includes a propagation permit tag which is used during operation of a store capability instruction to inhibit the execution of the instruction if in a first state and to permit the execution of the instruction if in a second state.

5. In a time-sharing data processing system including a a number of storage modules adapted to store information in segments and at least one processing unit including a plurality of capability register means each arranged to store segment descriptor information indicative of a base and limit memory address of an information segment together with access-type information (PAB) indicative of the permitted mode of access which may be used to access a segment defined by the base and limit memory address of an information segment, each of said at least one processing unit including means (CPU) for executing a load capability register instruction (LCIW, SCIW) whose instruction word contains information defining (a) the identity of a capability register means to be loaded, (b) the identity of a first one of said capability register means and (c) an offset value, including (i) a first one of said capability register means for holding the address of first segment descriptor relative to an information segment which contains a reserved segment pointer table particular to a program currently being executed by said processing unit, (ii) a second one of said capability register means for holding a second segment descriptor relative to an information segment which contains a master capability table, said master capability table having an entry for each information segment in said storage modules, each entry including information defining the base and limit addresses of a segment, said reserved segment pointer table including a list of data words which are used as pointers to define different entries in said master capability table, each of said data words in said reserved segment pointer table being accompanied by permitted access-type information, and (iii) capability register loading means comprising:

first means for forming an address of a pointer word in said reserved segment pointer table by adding said offset value to the base address held in said first one of said capability register means;

second means for reading a data word from the formed address in said reserved pointer table;

third means for inserting the permitted access-type information read from said pointer word into said capability register means to be loaded;

fourth means for forming an entry address in said master capability table by adding the pointer word read from said reserved pointer table to the base address held in the said second one of said capability register means; and fifth means for reading the base and limit information from the entry addressed by said fourth means in said master capability table into the capability register means to be loaded;

the improvement comprising a pointer register and a load on use indicator means for each capability register and the capability register loading means includes;

first additional means responsive to said second means and arranged to load the pointer register corresponding to the capability register to be loaded with the data word read by said second means, and second additional means responsive to said first additional means and arranged to set the load on use indicator means corresponding to the capability register to be loaded to a first state and to postpone the operation of said third, fourth and fifth means until the program currently being executed requires use of the said capability register to be loaded.

6. A data processing system according to claim 5 in which said capability register loading means includes third additional means responsive to said fifth means to reset said load on use indicator means to a second state.

7. A data processing system according to claim 5 in which said first additional means includes means for performing a load capability register masked instruction which comprises the steps of making out selected access bits to reduce the permitted access right of the data word loaded into the said pointer-register.

8. A data processing system according to claim 6 in which said first additional means includes means for performing a load capability register masked instruction which comprises the steps of masking out selected access bits to reduce the permitted access right of the data word loaded into the said pointer-register.

9. A data processing system according to claim 5 in which the permitted access code includes a propagation permit tag which is used during the operation of a store capability instruction to inhibit the execution of the instruction if in a first state and to permit the execution of the instruction if in a second state.

* * * * *